United States Patent [19]

Guiader

[11] 4,453,858
[45] Jun. 12, 1984

[54] SAFETY DEVICE FOR MARINE PLATFORM

[75] Inventor: Alain Y. Guiader, Nantes, France

[73] Assignee: Brissonneau & Lotz Marine, Carquefou-Nantes, France

[21] Appl. No.: 280,796

[22] Filed: Jul. 6, 1981

[30] Foreign Application Priority Data

Jul. 30, 1980 [FR] France .................... 80 16816
Jun. 1, 1981 [FR] France .................... 81 10809

[51] Int. Cl.³ .................... E02B 17/08; B66F 1/00
[52] U.S. Cl. .................... 405/198; 254/95
[58] Field of Search ........... 405/196, 198, 199, 195; 254/95, 97, 105, 106, 107

[56] References Cited

U.S. PATENT DOCUMENTS

| | | | |
|---|---|---|---|
| 2,919,682 | 6/1960 | Sung | 121/70 |
| 2,924,077 | 8/1960 | Le Tourneau | 61/46.5 |
| 3,343,371 | 11/1967 | Heitkamp | 61/46.5 |
| 3,967,457 | 7/1976 | Lovie | 405/198 |
| 4,007,914 | 2/1977 | Sutton | 405/198 X |

*Primary Examiner*—David H. Corbin

*Attorney, Agent, or Firm*—Rines and Rines, Shapiro & Shapiro

[57] ABSTRACT

The present invention concerns marine platforms designed for carrying out drilling operations at sea. More precisely, it concerns platforms equipped with a number of retractable pads, which, in the retracted position, allow the platform to be moved by flotation, and, in the support position on the sea bottom, allow the platform to be raised above the surface of the sea by means of elevator devices, consisting of at least a pair of pinions for each pad, these pinions engaging with racks provided for the purpose. According to the invention, the safety device includes, for each pinion-equipped pad (1), at least one pair of pinions (8-9) mounted on a support chassis (12) attached to the platform, together with a brake on each pinion axle (10-11) engaging the same side of the rack. The preferred manner of attaching the support chassis to the platform is by means of a joint mounted on an eccentric (14) which allows for horizontal displacement to compensate for lateral play using a cam, for example.

8 Claims, 4 Drawing Figures

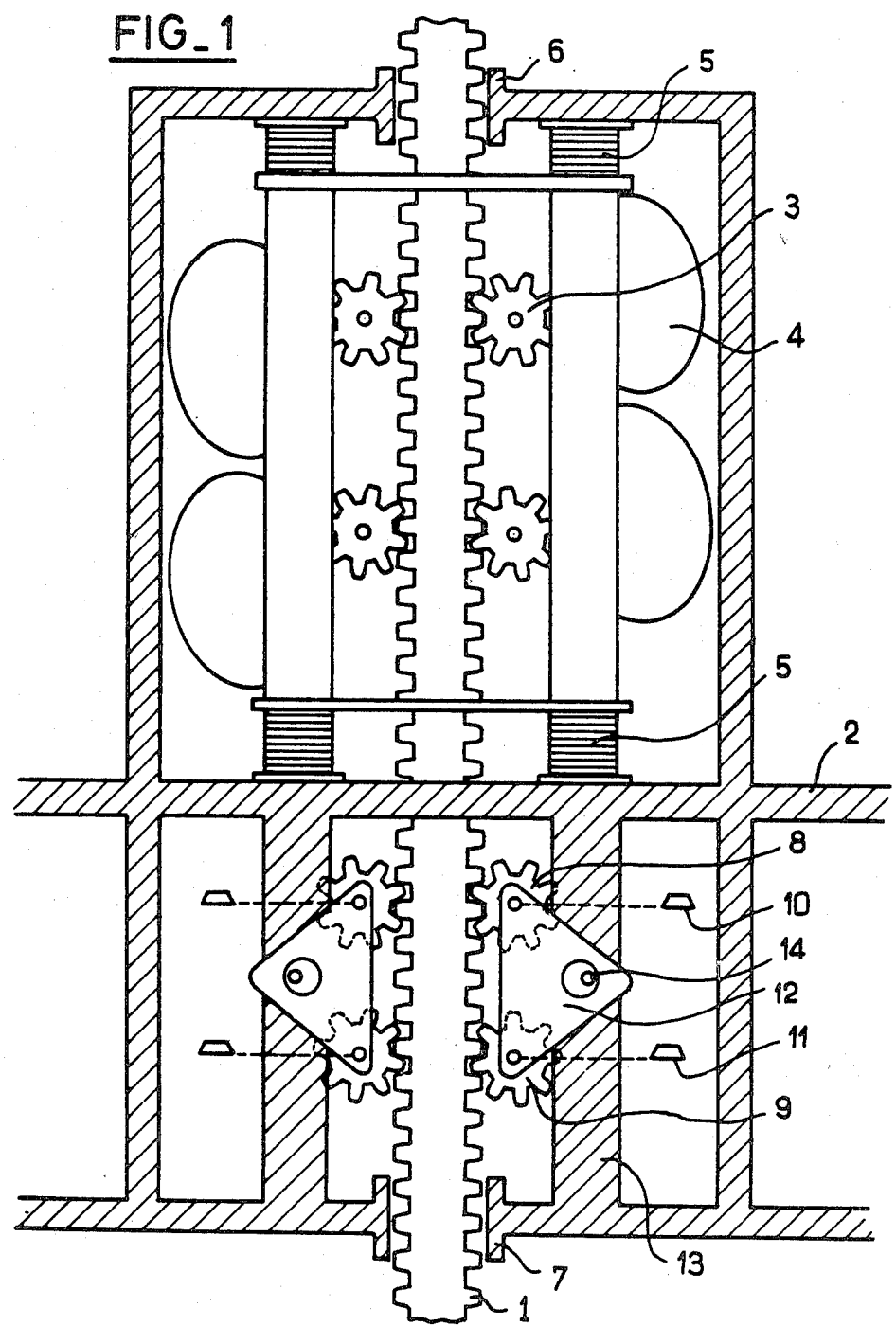
FIG_1

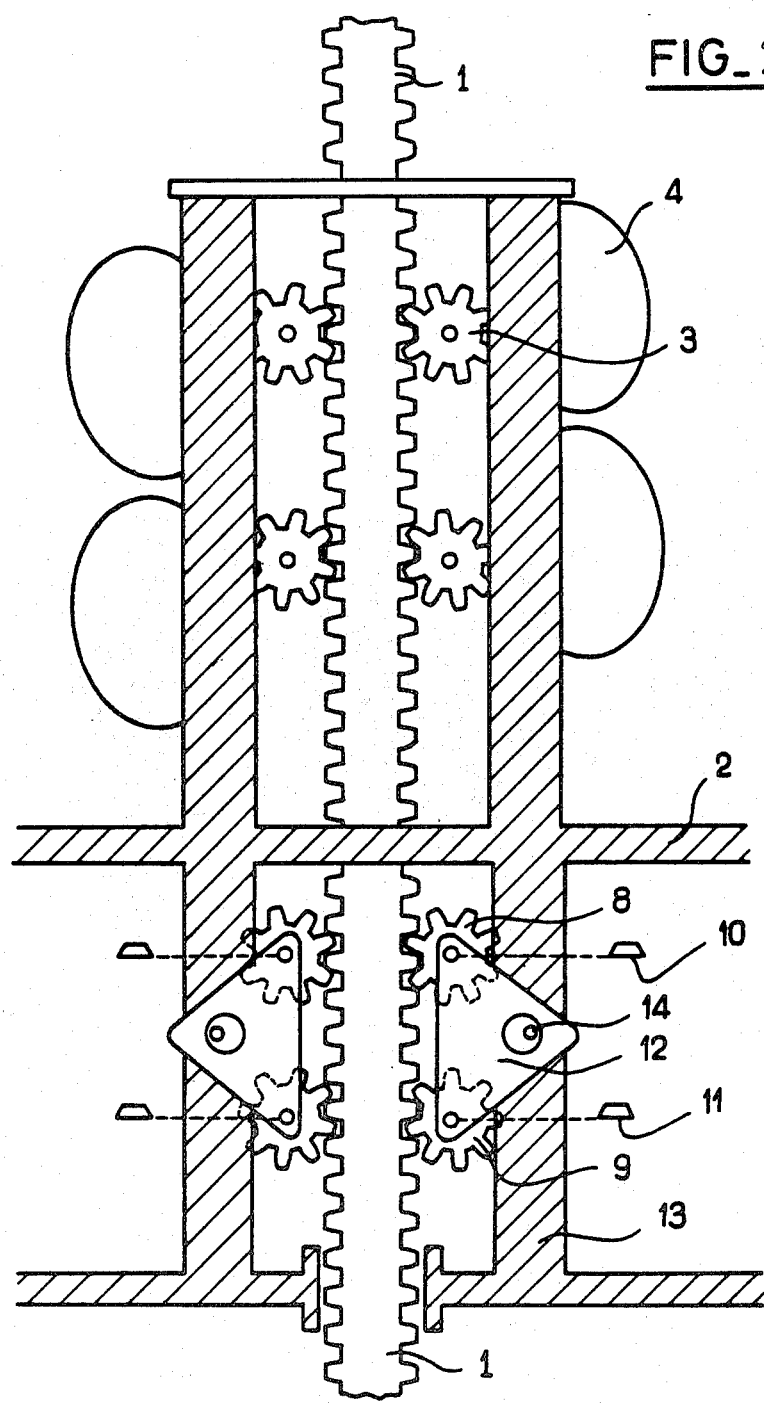
FIG_2

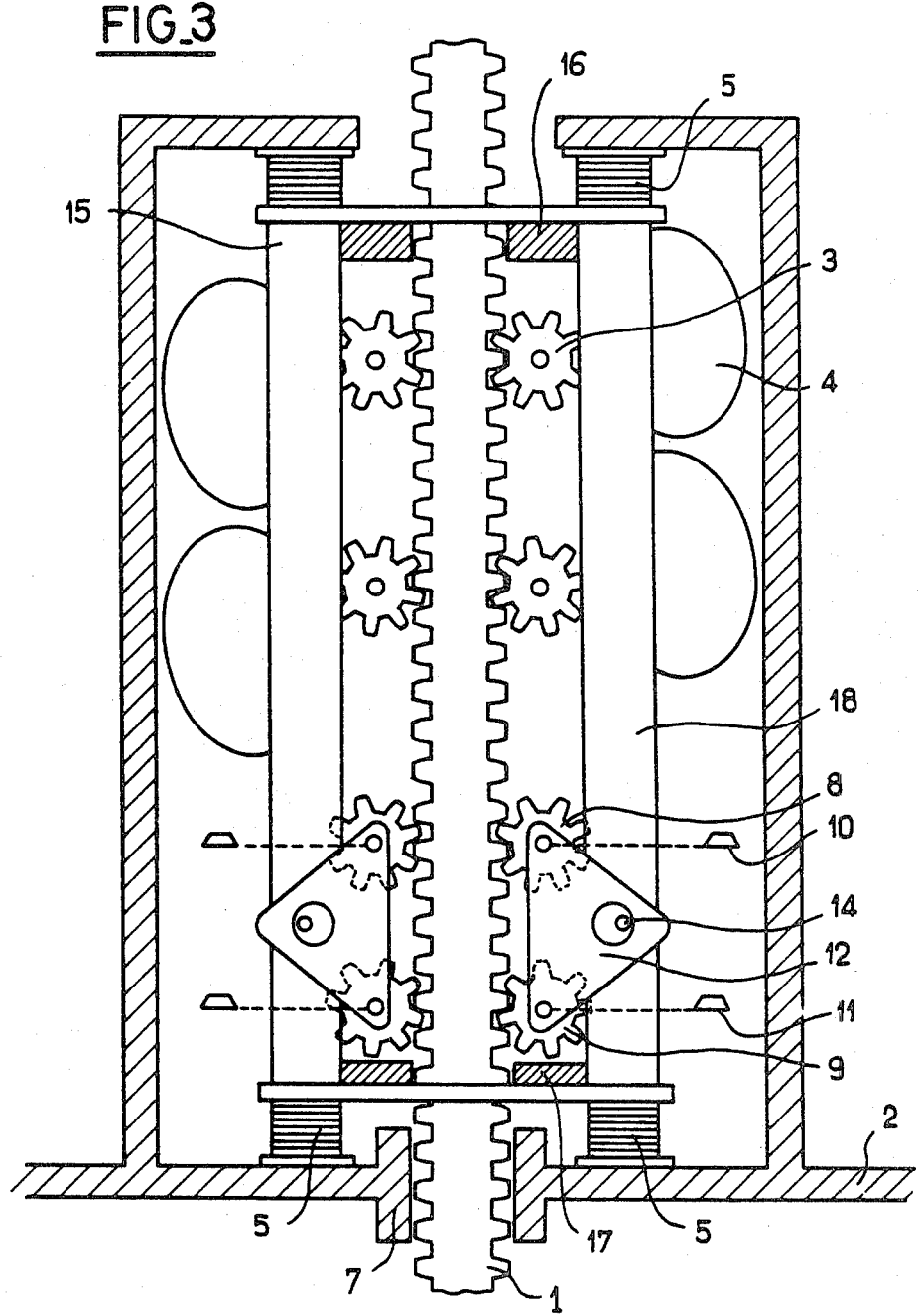

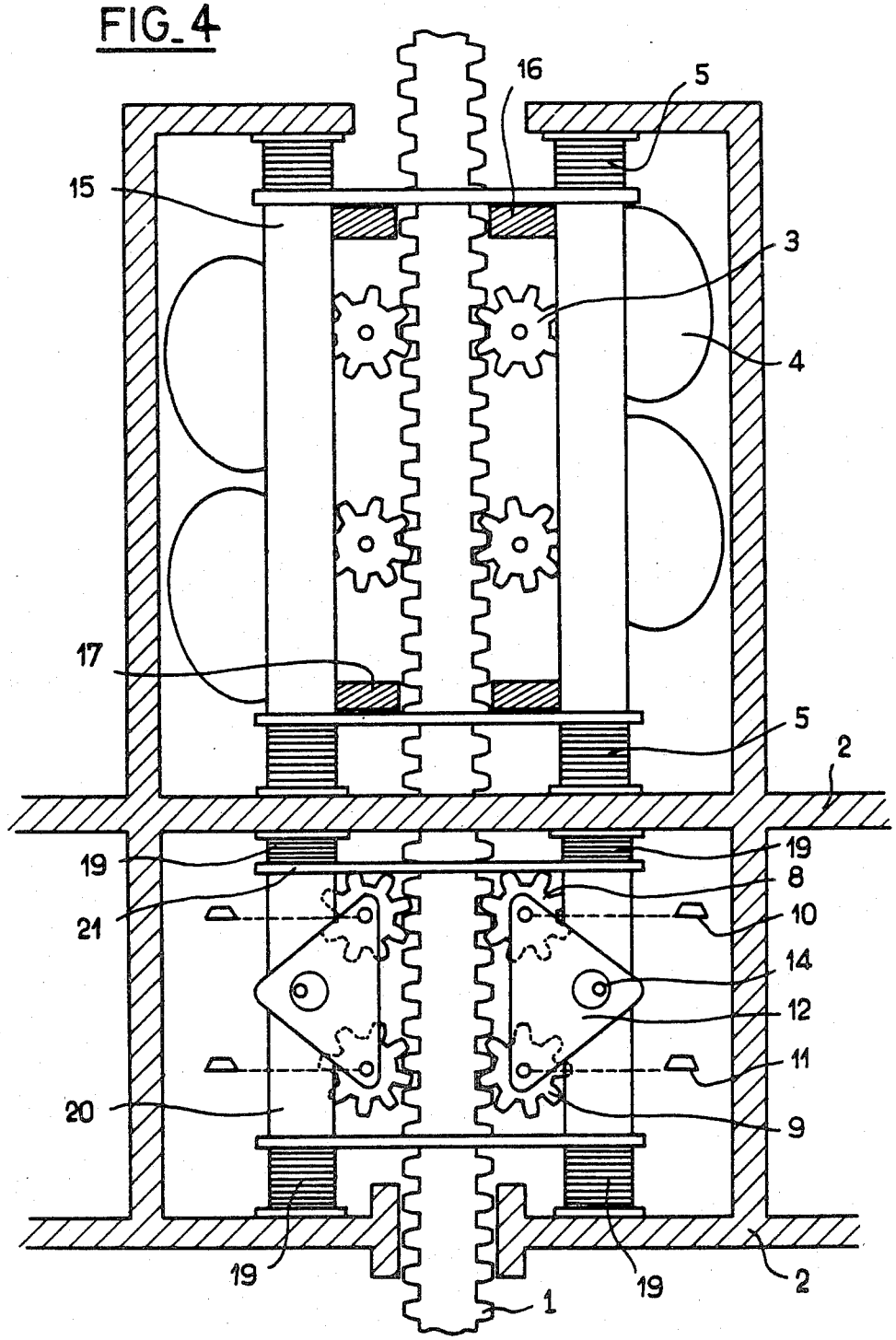
FIG_4

SAFETY DEVICE FOR MARINE PLATFORM

The present invention concerns marine platforms designed for carrying out drilling operations at sea. More precisely, it concerns platforms equipped with a number of retractable pads, which, in the retracted position, allow the platform to be moved by flotation, and, in the support position on the sea bottom, allow the platform to be raised above the surface of the sea by means of elevator devices, consisting of at least a pair of pinions for each pad, these pinions engaging with racks provided for the purpose.

Such platforms have been described, for example, in U.S. Pat. Nos. 2,919,682 (Sung), 2,924,077 and 3,044,269 (Le Tourneau).

Broadly speaking, ocean currents and/or winds generate external forces that bear on the different pads of the platform in addition to the weight of the platform itself. In order to withstand these forces guide blocks integral with the platform are generally provided for each pad.

This arrangement results in the application of variable vertical forces to the points of contact between the pinion teeth of the elevator and the rack attached to the pads.

Although these forces are negligible in periods of calm, they can become considerable during storms, thus setting limits to the useful weight of the platform.

Furthermore, since the elevator pinions permanently support at least the weight of the platform, it is quite difficult to replace a defective elevator mechanism at sea. During storms replacement becomes practically impossible.

For the dual purpose of overcoming the effects of these forces and carrying out necessary replacements at sea, the known method is to introduce chocks between the teeth of the racks by means of jacks pressing against the platform and preventing further motion, or else to use a locking device such as the one described in U.S. Pat. No. 3,343,371.

Such devices offer the disadvantage of being difficult to automate, however, because the chocks must be precisely positioned between the teeth of the rack in order to be effective.

Furthermore, since these devices are not always engaged with the rack and can be installed only when relative motion of the pads with respect to the platform has completely ceased, they cannot be used as a safety device during the critical period when the platform is being raised above the ocean surface.

The object of the present invention is to eliminate these drawbacks by means of a simple device which operates fully automatically and can be used at any time.

According to the invention, the safety device includes, in summary, for each pinion-equipped pad, at least one pair of pinions mounted on a support chassis attached to the platform, together with a brake on each pinion axle engaging the same side of the rack. The preferred manner of attaching the support chassis to the platform is by means of a joint which can, if necessary, be moved perpendicular to the rack in such a way as to carry the support chassis with it. This sideward movement can be obtained, for example, by using a cam. In one embodiment of the invention, elastic insulators are provided between the support chassis and the platform.

The present invention will be better understood, and other purposes, advantages, and characteristics will emerge more clearly, if the following description is read with two figures of drawings, attached.

FIG. 1 is a schematic representation of a vertical cross-section through the plane of one rack, a type of elevator device with elastic shock absorber to which a security device as specified in the present invention is attached;

FIG. 2 gives a similar view of another type of elevator device, this one being rigidly attached to the platform and also equipped with a safety device as specified in the present invention.

FIG. 3 shows one form of realization in which the chassis supporting the clamp controls and the elevator device are attached to the lateral supports of a common structure; and FIG. 4 shows a form of realization in which the chassis supporting the clamp controls and the elevator device are attached to independent structures.

Referring now to FIG. 1, rack 1 is solidly attached to one of the retractable pads of platform 2. In a known fashion, the elevator device comprises of pinions 3 which engage with the rack, and these pinions are caused to rotate by motors 4, generally through reducers. The entire elevator assembly floats with respect to the platform on elastic pads 5.

Guide blocks 6 and 7 are fitted, respectively, at the top of the elevator device and in the lower part of the platform. With this type of elevator device, the total force is distributed in such a way that the forces generated by the weight of the platform only are applied to the points of contact between the teeth of the pinion and the rack, whereas external forces are applied to guide blocks 6 and 7, which are solidly attached to the platform.

With this type of elevator device, the safety device described in the invention makes it possible to take up the vertical forces supported by the elevator pinions, in particular when the mechanism is defective.

Referring to the drawing, the safety device comprises two assemblies, each comprising two pinions 8, and 9, together with two brakes, normally applied, one associated with the shaft of each pinion, 10 and 11.

The brakes may be of the disc or shoe type, for example. The two pinions 8 and 9 are mounted on a support chassis 12 attached to structure 13 of the platform by means of a joint 14, which preferably consists of an eccentric. In order to prevent the safety device from being a hindrance when the platform is being moved vertically, play must be provided between the pad racks and pinions 8 and 9, whose brakes 10 and 11 are then released. In the rest position of the platform, however, no play should remain between pinions 8 and 9 and the rack. Thus cam 14 is provided to move the support chassis 12 toward the rack in order to eliminate this play. Brakes 10 and 11 are then reapplied. The rest position of brakes 10 an 11 is, preferably, with the brakes applied.

It should be noted that such a safety device is always ready for operation, in particular while the platform is being maneuvered. It thus represents a genuine safety device, which can be fully automated and controlled along with the elevators from the platform's central command post.

Referring now to FIG. 2, another type of elevator device is shown. Here, the mechanisms 4 are solidly attached to platform 2. Without the safety device as described in the invention, the teeth of the pinions 3 support the weight of the platform and further serve as points of application for external forces. The safety device as described in the invention can therefore be substituted for the pinions 3 of the elevator.

It is easy to see that no position of the pads relative to the platform is privileged over any other for the operation of the safety device, since the device is always ready and there is no need to wait for a coincidence of the pinion teeth and the rack.

Finally, it should be noted that such a device can be used to advantage when a temporary excess of weight is applied to each pad in succession in order to sink the pads into the ocean bottom.

Referring now to FIG. 3, support chassis 12 is mounted directly on the lateral elements 18 of supporting structure 15 of the elevator device, which comprises of pinions 3 engaging rack 1 along with the drive motors 4. The common support structure 15 is held in place within the structure of platform 2 by elastic supports 5. References 16 and 17 designate additional means for guiding the movement of rack 1 relative to support structure 15 of the elevator device acting on the rack. In FIG. 4, support chassis 12 is attached to lateral elements 20 of a structure 21, which is independent of structure 15 of the elevator device set on top of it. Structure 21 is held in place within the structure of the platform by means of elastic supports 19. References 16 and 17 designate additional means of guidance identical to those shown in FIG. 3.

Using this floating method of mounting the safety clamp controls in relation to the platform structure makes it possible, in particular, not to lose the advantages of the corresponding floating mounting of the elevator devices, and to enhance the overall safety while not increasing the load on the elevators when the platform load is heavy. Although only certain preferred embodiments of the invention have been described, it is clear that any modifications made by those in this art in the same spirit would continue to be covered by the present patent. For example, elastic pads could also be installed laterally between the lateral elements of the structure and the vertical part of the platform structure, so as to take up certain lateral forces.

I claim:

1. Safety device for a marine platform designed for ocean drilling operations, said platform being equipped with a number of retractable pads provided with racks, which in the retracted position allow the platform to be moved by flotation and which in the support position on the sea bottom allow the platform to be raised above the surface of the sea by means of elevator devices attached to the platform, each elevator device including motor means and at least one pair of pinions driven thereby and engaging one of said racks, said safety device being characterized by the fact that it includes, for each one of the said racks, at least one further pair of pinions engaging said one rack and mounted on a support chassis that is separate from and independent of said elevator devices and is attached to the said platform separately from said elevator devices, said safety device also including a normally engaged brake fitted to the shaft of each of the last-mentioned pinions and preventing rotation of the same, each further pair of pinions and the associated brakes operating independently of the motor means and the first-mentioned pinions.

2. Safety device as in claim 1 characterized by the fact that the support chassis is attached to the platform by means of a joint.

3. Safety device as in claim 2 characterized by the fact that said joint can be moved perpendicularly to the corresponding rack in such a way as to cause the support chassis and its pinions to move along with it to control engagement of those pinions with the corresponding rack.

4. Safety device as in claim 3 characterized by the fact that said perpendicular movement is obtained by means of a cam.

5. Safety device as in claim 1 characterized by the fact that said support chassis is attached to said platform through elastic supports.

6. Safety device as in claim 5, characterized by the fact that said support chassis is attached to a lateral element of a structure supporting the elevator device that acts on the corresponding rack, said structure being held in place within the structure of said platform by elastic supports.

7. Safety device as in claim 5, characterized by the fact that said support chassis is attached to a lateral element of a structure below and independent of the structure supporting the elevator device that acts on the corresponding rack, said independent structure being held in place on the platform structure with elastic supports.

8. Safety device for a marine platform and the like, said platform being equipped with retractable pads for supporting the platform, each pad having a rack with an elevator device attached to the platform and including motor means and pinion means driven thereby and engaging the rack, so that the platform may be raised and lowered by operation of the motor means and the pinion means, said safety device being characterized in that it includes for each one of said racks further pinion means engaging said one rack and mounted on a support chassis that is separate from and independent of the elevator devices and is attached to the platform separately from the elevator devices, the further pinion means being independent of the first-mentioned pinion means and having normally engaged brake means for preventing rotation of the further pinion means, the further pinion means and the associated brake means operating independently of the operation of the motor means and the first-mentioned pinion means.

* * * * *